Nov. 25, 1930.   J. H. GAVIN   1,782,758
FAUCET SCREEN
Filed Feb. 20, 1926
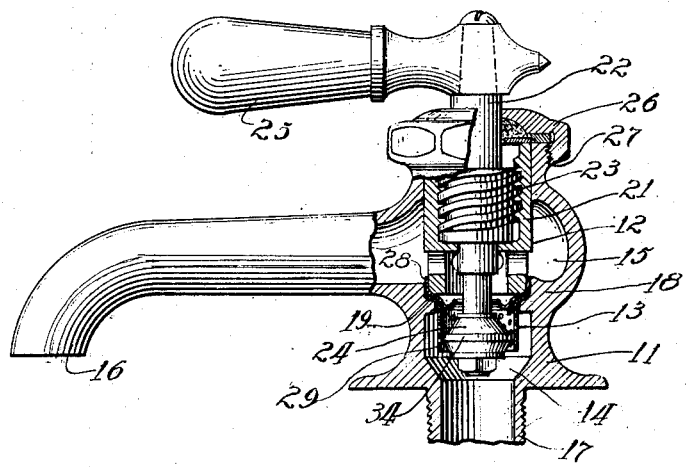
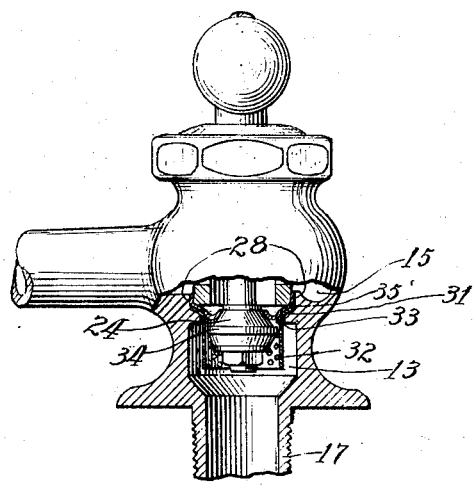
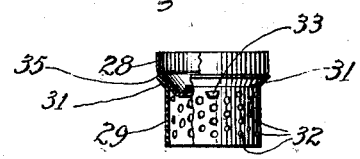
Inventor:
John H. Gavin
By: Munday, Clarke & Carpenter
Att'ys Patented Nov. 25, 1930

1,782,758

UNITED STATES PATENT OFFICE

JOHN H. GAVIN, OF CHICAGO, ILLINOIS, ASSIGNOR TO THE CHICAGO FAUCET COMPANY, OF CHICAGO, ILLINOIS, A CORPORATION OF ILLINOIS

FAUCET SCREEN

Application filed February 20, 1926. Serial No. 89,554.

This invention relates in general to valves, and more particularly to valves of the type commonly used in faucet fixtures, and the like.

The principal object of the invention is the provision of a valve having means for protecting the valve seat and plunger against abrasion and wear caused by small particles or grit material carried in suspension in water or similar fluids and which strike against or abrade valve parts in passing through the valve fixture. The abrasion caused by such grit substances quickly wears the parts and it is necessary to frequently renew the valve seat and plunger parts in valves of ordinary construction. In the past faucets have been provided with screens in the outlet portion in order to filter the water and sift out the impurities before it is used, but such construction does not protect the valve seat and plunger. In piping installations a number of chips removed from the pipe in thread cutting operations frequently remain inside the pipe, and together with sand and other grit become lodged in the pipe and fixtures. Some of this grit may be removed by turning on the water and allowing it to flow at full force through the piping before the faucet fixtures are attached. However, not all of the grit may be removed in this manner and the remaining particles become loosened from time to time after the system has been placed in operation and pass with the water through the valve seat where they may become lodged between the valve seat and plunger, or they may merely scratch the parts in passing through the fixture. Under such conditions the valve parts are quickly abraded to an extent destroying their operative utility. Another cause for wear in the valve parts is boiler scale, and the like, which is deposited upon the inner walls of boilers or water heating devices and becoming dislodged from time to time abrades the parts in passing through the valve.

A further important object of the invention is the provision of a removable element for valves which is adapted to prevent scouring of the valve parts and which may be assembled and removed as a unit together with the valve operating mechanism assembly to facilitate repair or replacement.

Another important object of the invention is the provision of a removable valve element which provides a valve seat of improved construction and a guard or baffle adapted to screen the valve seat and protect it from abrasion during the operation of the valve.

Referring to the drawings:

Figure 1 is an elevational view of a valve construction of my invention embodied in a faucet fixture, parts of which are broken away to reveal details of construction, the valve parts being shown in open position;

Fig. 2 is a similar view showing the valve parts in closed position; and

Figs. 3 and 4 are detail views of a valve seat and guard embodying my invention.

To illustrate my invention I have shown on the drawings a faucet fixture comprising a faucet body or valve housing 11, a removable valve mechanism assembly 12, and a removable valve element 13 comprising a valve seat and an apertured guard or baffle for protecting the valve parts against abrasion. The housing 11 is formed to provide an inlet chamber 14 and an outlet chamber 15. The outlet chamber 15 communicates with a spout 16 and the inlet chamber 14 communicates with a threaded inlet portion 17 extending from the housing 11 and to which a suitable pipe or other fluid conductor may be connected. The walls of the valve housing are constricted at 18 between the inlet and outlet chambers and are arranged to form an inwardly disposed flange which functions as a seat retaining member 19 surrounding the passage between the two chambers.

The removable valve mechanism assembly 12 includes a sleeve 21 arranged to engage within the housing 11, a valve stem 22 carried by said sleeve and having threaded engagement therewith at 23, a valve plunger 24 carried by the lower end of said stem and a handle 25 which is of a suitable form and secured to the upper end of the valve stem to provide means for operating the valve. A cap 26 having threaded engagement with the body 12 at 27 is provided to secure the valve mechanism assembly in operative position in the valve body.

The device 13 comprises an upper annular portion 28, the lower edge of which is bent inwardly and downwardly at 35 and rebent upwardly to provide a valve seat projecting into the passage between the inlet and outlet chambers 15 and 16 and against which the plunger 24 may engage to close the valve and thus to cut off the passage of fluid from the chamber 14 to the chamber 15. The annular portion 28 is arranged to engage in the seat retaining member 19 formed in the wall 18 of the faucet body 11. A sheet metal part 29 of substantially cylindrical form having an outwardly bent flange 31 at one end and a plurality of apertures 32, through which fluid may pass, formed in the body thereof is secured to the part 28 by means of the flange 31 which engages the part 28 at 35. The parts are secured together by means of solder, or the like, or the parts may be formed from a single piece of sheet metal, or they may be formed separately in which case it is preferable to provide means for removing the part 29 together with the valve assembly. To accomplish this, a plurality of fingers or projections 33 are bent inwardly from the internal surface of the part 29, and arranged to engage a projecting portion 34 of the plunger 24. These fingers are located at a point remote from the path of the portion 34 during the normal operation of the valve plunger. When formed separately, the part 29 is held in operative position in the retaining member 19 by means of the flanged portion 31, which is arranged to engage the seat.

The combined baffle and valve seat element 13 provides a metal valve seat of a suitable material, such as sheet metal, and a depending screen or strainer for removing grit particles from the liquid passing through the valve. The valve seat provides a surface offering a minimum resistance to the passage of the fluid through the valve and thus eliminates undue wearing of the part due to abrasion. The screen functions to sift out abrasive substances from the fluid thereby decreasing abrasion of the parts.

The faucet is assembled by first positioning the valve stem 22 in threaded engagement with the valve stem housing 21. The lower end of the valve stem which protrudes beneath the housing 21 is then passed through the combination valve seat and strainer device 13, the valve stem engaging loosely through the valve aperture and the cylindrical baffle, and the plunger is finally secured to the end of the valve stem below the element 13. The assembled parts are then slid downwardly into the interior of the faucet body 11 so that the flange 31 engages the retaining member 19 and the valve seat element 28 is supported by the flanged portion 31. The lower edge of the cylindrical housing 21 engages the valve seat portion 28. In this manner the various parts are supported in position in the faucet body. The cap 26 is then secured to the faucet body to hold the parts in place. Finally the handle 25 is secured to the upper end of the valve stem.

As shown, the projecting cylindrical portion 34 of the valve body is located below the effective seating surface thereof and fits the inner wall surface of the strainer 29; hence, in the operation of the valve, the fluid must pass through the strainer apertures 32 before it can come into contact with either the valve seat 28 or the companion surface of the valve body.

In operation when the valve is open fluid passes from the inlet chamber 14 through the perforations 32 in the part 29 and between the valve plunger 24 and the valve and into the outlet chamber 15. As the valve seat is inclined in the direction of flow, it offers a minimum resistance to the passage of the fluid. The size of the apertures 32 is such that relatively fine particles of grit or solid substances are prevented from passing through the valve. The length of the part 29 is sufficient to surround the plunger throughout its entire range of movement, that is to say from a fully open to a fully closed position. The strainer 29 and the plunger cylindrical portion 34 are made of such relative dimensions as to permit free movement of the plunger, but without permitting the escape of fluid between the plunger and the inner surface of the strainer. When the elements 28 and 29 of the device 13 are made integrally or otherwise secured together the two parts are removed together with the valve assembly when the latter is removed from the faucet for cleaning or repair. When the parts are separately formed the valve seat part 28 engages above the plunger and is removed in the usual manner. The baffle 29 having fingers 33 which engage the portion 34 of the plunger is also removed together with the plunger.

It is thought that the invention and many of its attendant advantages will be understood from the foregoing description, and it will be apparent that various changes may be made in the form, construction and arrangement of the parts without departing from the spirit and scope of the invention, or sacrificing all of its material advantages, the form hereinbefore described being merely a preferred embodiment thereof.

I claim:

1. A valve comprising a body having inlet and outlet chambers, an apertured wall separating said inlet and outlet chambers, and formed to provide a valve seat support, a valve stem housing positioned in said body and having a lower end extending adjacent the apertured wall, means for securing said housing in operative position, and devices positioned in the seat support in said wall and clamped thereagainst by the housing formed to provide a flanged valve seat and a baffle to strain the fluid passing to valve seat.

2. A valve comprising a body having inlet and outlet chambers, an apertured wall separating said inlet and outlet chambers, and formed to provide a seat, valve mechanism assembly positionable in said body and extending toward the apertured wall, means for securing said valve mechanism assembly in operative position, and means having its top portion positioned in the seat in said wall and clamped therein by the valve mechanism assembly and formed and arranged to provide a valve seat and a baffle to strain fluid passing to said valve seat, said means comprising devices of sheet metal formed to provide a sheet metal valve seat arranged to surround the valve stem and to engage the plunger and to provide a depending portion having perforations therein adapted to pass fluid and to prevent the passage of particles of gritty substance.

3. A faucet comprising a body having inlet and outlet chambers, a wall in said body between said inlet and outlet chambers having an opening and formed to provide a seat, a sleeve positionable in the outlet opening in said body and formed to extend to adjacent the seat in said wall, a valve stem carried by said sleeve and extending through said opening in said wall, means for clamping the sleeve in operative position in said body, and a device engaged between the seat in the wall and the sleeve, formed to provide a valve seat comprising an inwardly disposed flange surrounding said valve stem and a depending apertured screen arranged to strain fluid before it strikes the valve seat.

4. A faucet comprising a body having inlet and outlet chambers, a wall in said body between said inlet and outlet chambers having an opening and formed to provide a seat, a sleeve positionable in the outlet opening in said body and formed to extend to adjacent said seat, a valve stem carried by said sleeve and having a lower end extending through said wall and carrying a plunger, means for securing the sleeve in operative position in said body, and a device engaged between said seat and said sleeve and formed to provide a sheet metal valve seat and an apertured baffle embracing said plunger and adapted to strain fluids before reaching the valve seat, said plunger being movable within said baffle device to engage said valve seat.

5. A valve structure comprising a body having inlet and outlet chambers and including a wall providing a passage connecting said chambers, said wall having a valve seat support, a valve assembly positioned in said body and including a valve stem and a surrounding housing, a combined strainer and valve seat device supported at its upper end on said seat support and surrounding the lower portion of said valve stem, and a plunger mounted on said stem and fitting the wall of said strainer below the seating portion of the plunger to force the passage of fluid through the strainer before it can come into contact with either the valve seat or the seating portion of the plunger.

6. A valve structure comprising a body having inlet and outlet chambers and including a wall providing a passage connecting said chambers, a valve assembly positioned in said body and including a valve stem and a surrounding housing, a combined strainer and valve seat device supported within said connecting passage and surrounding the lower portion of said valve stem, and a plunger mounted on said stem and fitting the wall of said strainer below the seating portion of the plunger to force the passage of fluid through the strainer before it can come in contact with either the valve seat or the seating portion of the plunger.

7. A valve comprising a body having inlet and outlet chambers, an apertured wall separating said inlet and outlet chambers and formed to provide a valve seat support, a valve stem housing positioned in said body and having a lower end extending adjacent the apertured wall, means for securing said housing in operative position, and devices positioned in the seat support in said wall and clamped thereagainst by the housing formed to provide a sheet metal valve seat and a baffle to strain the fluid passing to said valve seat.

8. A valve structure comprising a body having inlet and outlet chambers and including a wall providing a passage connecting said chambers, a sheet metal valve seat mounted within said wall and projecting in the direction of flow of the liquid, a strainer cooperating with said valve seat, and a valve plunger working within said strainer and cooperating with the wall thereof below the seating portion of the plunger to force the passage of fluid through the strainer before it can come into contact with either the valve seat or the seating portion of the plunger.

9. A valve structure comprising a body having inlet and outlet chambers and including a wall providing a passage connecting said chambers, a combined strainer and valve seat device mounted within said connecting passage and including a sheet metal valve seat inclined in the direction of flow of the liquid, a valve plunger working within said strainer and cooperating therewith to force the passage of fluid through the strainer before it can come into contact with either the valve seat or the seating portion of the plunger.

10. A valve fitting comprising an upper cylindrical portion and a lower foraminous cylindrical portion of reduced diameter relatively to said upper cylindrical portion and connected therewith by an inclined wall, and an inwardly projecting valve seat supported by said inclined wall and including a downwardly bent annular flange rebent at its lower end into an upwardly bent flange to provide a sheet metal valve seat inclined in the direction of flow of the liquid.

JOHN H. GAVIN.